US009736712B2

(12) United States Patent
Yilmaz et al.

(10) Patent No.: US 9,736,712 B2
(45) Date of Patent: Aug. 15, 2017

(54) DISTRIBUTED SMALL-CELL SEARCH

(71) Applicant: Nokia Technologies Oy, Espoo (FI)

(72) Inventors: Osman Yilmaz, Espoo (FI); Mikko Uusitalo, Helsinki (FI); Carl Wijting, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 56 days.

(21) Appl. No.: 14/910,181

(22) PCT Filed: Aug. 6, 2013

(86) PCT No.: PCT/US2013/053827
§ 371 (c)(1),
(2) Date: Feb. 4, 2016

(87) PCT Pub. No.: WO2015/020641
PCT Pub. Date: Feb. 12, 2015

(65) Prior Publication Data
US 2016/0174088 A1 Jun. 16, 2016

(51) Int. Cl.
H04W 24/10 (2009.01)
H04W 24/08 (2009.01)
H04W 36/00 (2009.01)
H04W 48/12 (2009.01)
H04W 84/04 (2009.01)
H04W 48/16 (2009.01)

(52) U.S. Cl.
CPC .......... H04W 24/08 (2013.01); H04W 24/10 (2013.01); H04W 36/0083 (2013.01); H04W 36/0088 (2013.01); H04W 48/12 (2013.01); H04W 48/16 (2013.01); H04W 84/045 (2013.01)

(58) Field of Classification Search
CPC ... H04W 24/10; H04W 84/045; H04W 48/16; H04W 36/0094; H04W 24/08; H04W 36/0083; H04W 48/12; H04W 36/0088
USPC ......................................... 455/434, 443–444
See application file for complete search history.

(56) References Cited

U.S. PATENT DOCUMENTS

| 2010/0144338 A1* | 6/2010 | Kim ...................... H04W 52/16 455/422.1 |
| 2011/0051650 A1* | 3/2011 | Winstok .................. H04W 4/08 370/312 |
| 2014/0200009 A1* | 7/2014 | Schier ................... H04W 64/00 455/446 |

OTHER PUBLICATIONS

International Search Report and Written Opinion received for corresponding Patent Cooperation Treaty Application No. PCT/US2013/053827, dated May 19, 2014, 10 pages.

(Continued)

Primary Examiner — Marcus Hammonds
(74) Attorney, Agent, or Firm — Squire Patton Boggs (US) LLP

(57) ABSTRACT

Methods and apparatus, including computer program products, are provided for distributed small cell scanning. In some example embodiments, the method may include receiving, at a first user equipment, an indication to perform a distributed scan for one or more carrier frequencies with at least a second user equipment proximate to the first user equipment; performing, by the first user equipment in response to the received indication, the distributed scan by measuring a first carrier frequency during a first time period; and sending a measurement report of the first carrier frequency, when detected by the first user equipment. Related apparatus, systems, methods, and articles are also described.

17 Claims, 5 Drawing Sheets

(56) References Cited

OTHER PUBLICATIONS

Nokia Siemans Networks et al., "Background inter-frequency measurement for small cell discovery", 3GPP Draft; R2-131249 Background Small Cell Detection, vol RAN WG2, no. Chicago, USA; 2013415-20130419, Apr. 5, 2013. Retrieved from the Internet: URL http://www.3gpp.org/ftp/tsg_ran/WG2_RL2/TSGR2_81bis/Docs/ [retrieved on Apr. 5, 2013].
Alcatel-Lucent Shanghai Bell et al, "Network-Assisted Inter-frequency Pico Cell Discovery in LTE HetNets", 3GPP Draft; vol. RANWG2, no. Jeju Island, Korea; 20120326-20120330, Mar. 20, 2012 (2012-03-200, XP050606413 [retrieved on Mar. 20, 2012].
NTT Docomo et al., "Inter-frequency Pico cell measurements for Hetnet deployments", 3GPP TSG-RAN WG2 #76, Nov. 14-18, 2011, San Francisco, USA, vol. R2-115745, No. 76, Nov. 14, 2011, pp. 1-4, XP002668232, Retrieved from the Internet: URL: http://www.3gpp.org/ftp/tsg_ran/WG2_RL2/TSGR2_76/Docs/R2-115745.zip [retrieved on Jan. 26, 2012].

\* cited by examiner

DISTRIBUTED SMALL-CELL SEARCH

RELATED APPLICATION

This application was originally filed as Patent Cooperation Treaty Application No. PCT/US2013/053827 filed Aug. 6, 2013

FIELD

The subject matter described herein relates to wireless communications.

BACKGROUND

The use of heterogeneous networks (HetNets) may provide opportunities for offloading traffic from macrocells to a typically higher capacity small cell. The heterogeneous network may include one or more wireless access points, or base stations, such as for example an E-UTRAN (evolved Universal Mobile Telecommunications System Terrestrial Radio Access Network) NodeB base station serving macrocells and one or more small cell base stations serving small cells. For example, a small cell base station (or a wireless access point or a remote radio head) may be implemented to cover a small cell, or coverage area, examples of which include a residence, a small business, a building, an office, or a small area. As such, the small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less range and output power given its limited coverage area. For example, the small cell base station may be implemented as a wireless access point/femtocell base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage, as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

Methods and apparatus, including computer program products, are provided for distributed small cell scanning.

In some example embodiments, there is provided a method. The method may include receiving, at a first user equipment, an indication to perform a distributed scan for one or more carrier frequencies with at least a second user equipment proximate to the first user equipment; performing, by the first user equipment in response to the received indication, the distributed scan by measuring a first carrier frequency during a first time period; and sending a measurement report of the first carrier frequency, when detected by the first user equipment.

In some variations, one or more of the features disclosed herein including the following features can optionally be included in any feasible combination. The first user equipment may measure the first carrier frequency during the first time period, and the second user equipment may measure a second carrier frequency. The distributed scan may further include a schedule including a first time period during which the first user equipment scans the first carrier frequency and the second user equipment scans a second carrier frequency. The schedule may further include second time during which the first user equipment scans the second carrier frequency and the second user equipment scans the first carrier frequency. The one or more carrier frequencies may include the first and second carrier frequencies correspond to one or more wireless access points serving one or more small cells. When the first user equipment measures the first carrier frequency during the first time period, the second user equipment does not scan for small cells. The sending may further include sending the measurement report of the first carrier frequency to the network to enable the network to configure the second user equipment to scan the first carrier frequency. The first user equipment and the second user equipment may comprise a group determined by the network to perform the distributed scan.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
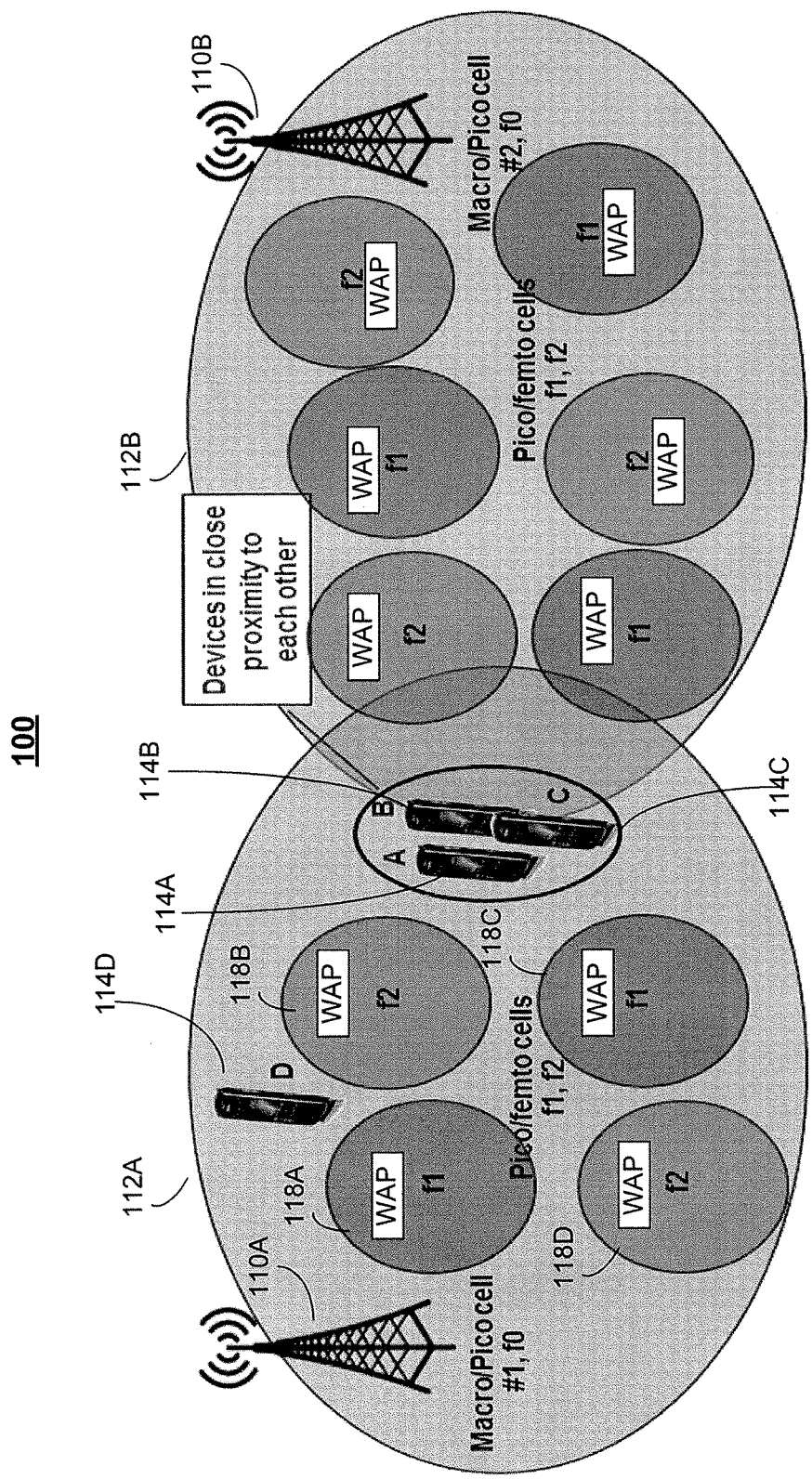
FIG. 1 depicts an example of a system including a group of devices configured to perform a distributed search for small cells, in accordance with some exemplary embodiments.

Like labels are used to refer to same or similar items in the drawings.

DETAILED DESCRIPTION

Although small cell deployment may offer some benefits, small cells may also result in user equipment expending resources, such as battery power, to scan and detect these small cells operating on the same or different carrier frequencies. Although scanning may adversely affect the user equipment in terms of shorted battery life, user equipment not configured to perform small cell scans (for example, searching for a small cell by making one or more measurements at one or more carrier frequencies) may also be adversely affected by not taking advantage of offloading opportunities. Furthermore, user equipment not offloaded from a macrocell to a small cell may reduce the overall macrocell capacity available to other user equipment.

In some example embodiments, the subject matter disclosed herein may relate to distributing among a plurality of user equipment small cell searching. In some example embodiments, the plurality of user equipment may be configured to share the small cell scanning task according to, for example, a schedule defining likely small cell carrier frequencies that should be scanned at a given time—distributing thus the sharing task among the plurality of user equipment. Although some of the examples refer to small cell searching, the subject matter disclosed herein may be used in connection with other operations, such as determining the presence of small cell interferers and the like.

FIG. 1 depicts an example of a system 100 including user equipment 114A-D, in accordance with some example embodiments.

In some example embodiments, a wireless access point, such as a base station 110A and the like, may provide an indication to one or more user equipment 114A-C to perform the distributed inter-frequency measurements. When received by the user equipment, the indication may represent an indication to perform distributed inter-frequency measurements by scanning for carrier frequencies used by for example small cells. Moreover, the indication may represent a schedule of what frequencies and/or when those frequencies should be measured as part of the scanning. For example, the small cell measurements performed by the user equipment may be configured by a measurement configuration command (which is sent by the network) defining when and how often measurements are to be performed, although the user equipment may also perform these small cell measurements autonomously without the network configuration command as well.

To illustrate further, base station 110A may send one or more indications to three user equipment, and these indications may schedule a first user equipment to scan frequency f1 at a first time period, a second user equipment to scan frequency f2 at the first time, and the third user equipment to not scan during this first time. The indication may also schedule a first user equipment to scan frequency f2 at a second time, a second user equipment to not scan at the second time, and the third user equipment to scan frequency f1 at the second time. In this example, the scanning for frequencies f1 and f2 has been distributed among three user equipment. If any of the user equipment identifies a carrier frequency of a small cell (which can be used for offloading or other purposes), the identified frequency and/or the small cell identity may be reported to the base station. For example, if the first user equipment detects carrier frequency f1 during the first time period, the first user equipment may report the detection to the base station. In this example, the base station may respond by reconfiguring the second and third user equipment to scan the detected carrier frequency f1 and/or by informing the second and third user equipment of any small cell identities that are found/detected. The base station may also respond by indicating to one or more of the user equipment to couple to the small cell base station at detected carrier frequency f1.

In some example embodiments, a plurality of user equipment searching carrier frequencies in a distributed manner may be adjacent to each other (for example, near each other) in the sense that detecting carrier frequencies is generally common and relevant to the group of adjacent user equipment. Moreover, in some example embodiments, the network including the base station may associate a plurality of user equipment into a group for purposes of performing distributed inter-frequency scanning as disclosed herein.

In some example embodiments, a network including a base station may, as noted, indicate to the group of user equipment 114A-C that measurements should be performed at one or more frequencies to identify small cells or small cell frequencies available in certain regions (for example, ultra-dense networks and/or other networks as well). The network including the base station may also send an indication (for example, a measurement instruction/command) to the group of adjacent (or nearby) user equipment 114A-C to distribute the measurement responsibilities within the group. This indication to distribute measurements may be signaled in an instruction with a specific schedule or may be derived locally by the user equipment (for example, a user equipment with an even identifier may measure one set of carrier frequencies, and user equipment with an odd identifier may measure another set of carrier frequencies).

User equipment 114A-D may be served by base station 110A and macrocell 112A at a certain frequency, f0. In this example, user equipment 114A-C are near each other (for example, in close proximity to each other) and within macrocell 112A and near a cell boundary with macrocell 112B and base station 110B. Macrocell 112A may include small cells 118A and 118C at frequency f1 and small cells 118B and 118D at frequency f2, and these small cells may each be served by a corresponding small cell wireless access point (labeled WAP).

Although the example of FIG. 1 refers to macrocell 112A and small cells 118A-D as picocells, other types of cells may be used as well. For example, macrocell 112A may be implemented as a picocell, while cells 118A-D may be implemented as femtocells. Moreover, the user equipment may do a small cell search when it is being served by a small cell (for example, when the received signal of the connected/coupled small cell becomes weaker).

In the example of FIG. 1, base station 110A may send an indication to user equipment 114A-C to perform a distributed inter-frequency carrier scan, which may be in accordance with a schedule.

Table 1 below depicts an example of a schedule for performing a distributed inter-frequency carrier scan at user equipment 114A-C. At a first time frame, user equipment 114A may be configured to scan (for example, make measurements) for frequency f1, user equipment 114B may be configured to not scan, and user equipment 114C may be configured to scan frequency f2. During the next time frame, user equipment 114A may be configured to scan for frequency f2, user equipment 114B may be configured to scan frequency f1, and user equipment 114C may be configured to not scan, and so forth through the time periods. Table 1 may thus provide a schedule for distributing the scanning among a plurality of user equipment. Table 1 also depicts that user equipment 114D, which is not part of the group sharing the scanning task, scans frequencies f1 and f2 without an "off" time. As a consequence, the scanning-associated power consumption of user equipment 114A-C may thus be less than that of user equipment 114D, which cannot rely on neighboring user equipment to share the scanning workload.

TABLE 1

| Device Name | Time Frame 1 | Time Frame 2 | Time Frame 3 | Time Frame 4 | Time Frame 5 | Time Frame 6 |
|---|---|---|---|---|---|---|
| User Equipment 114A | f1 | f2 | off | f1 | f2 | off |
| User Equipment 114B | off | f1 | f2 | off | f1 | f2 |
| User | f2 | off | f1 | f2 | off | f1 |

TABLE 1-continued

| Device Name | Time Frame 1 | Time Frame 2 | Time Frame 3 | Time Frame 4 | Time Frame 5 | Time Frame 6 |
|---|---|---|---|---|---|---|
| Equipment 114C | | | | | | |
| User Equipment 114D | f1 | f2 | f1 | f2 | f1 | f2 |

The time frames depicted at Table 1 may each correspond to a single measurement gap interval during which a single measurement task can be performed, although the time frames may each represent other times as well (for example, multiple intervals in which one or more measurement tasks can be performed and the like).

Although Table 1 depicts a schedule that partially distribute scanning among 2 out of the 3 user equipment at any given time, the scanning may be fully distributed among all 3 user equipment as well.

The use of distributed scanning, as described by the example of Table 1, may also enable carrier frequencies to be quickly identified, when compared to non-distributed techniques. For example, user equipment 114A-C scan, during the first time frame, frequencies f1 and f2, but user equipment 114D requires two time frames to search both frequencies f1 and f2.

In some example embodiments, the proximity of the user equipment may be determined by the base station. For example, base station 110A may determine that user equipment 114A-C are near each other and form a group that will share the inter-frequency measurements for carrier frequencies f1 and f2 in order to identify small cells.

In some example embodiments, when a scan by a given user equipment detects a frequency for a small cell, such as cell 118C at frequency f1, the measurement is reported to base station, such as base station 110A, although the detection may be reported to other wireless access points or user equipment (for example, via a device-to-device link). The base station may then signal one or more of the user equipment, such as user equipment 114A-C, to for example scan at the detected small cell carrier frequency, couple to the small cell, such as small cell 118C, and/or perform other actions as well.

In some example embodiments, when the discovered small cell, such as cell 118C, by a given user equipment, such as 114A, is a restricted or non-allowed small cell for a proximate user equipment, such as 114C, the base station 110A may not reconfigure user equipment 114C to search for or couple to the small cell 118C which is discovered by 114A. However, the measurement pattern may be reconfigured due to another reason (for example, the number of devices in the cluster changed since the user equipment switched to an idle mode or stops the small cell search).

In some example embodiments, the proximity of user equipment can be determined using Proximity Services (ProSe), such as ProSe services at the user equipment for scanning or detecting nearby devices, such as other user equipment. For example, user equipment 114A may use ProSe to detect nearby user equipment 114B-C, and report that proximity information to base station 110A, which may then form a group (or cluster) of user equipment to share the inter-frequency measurements in accordance with a schedule as disclosed herein. Other connection related information may be used as well to identify adjacent user equipment. For example, if user equipment 114A-C are in the same small cell, the same sector of a cell, and/or served by the same beam or beams, base station 110A may determine that the user equipment 114A-C may be adjacent and should be placed in a cluster for sharing the distributed inter-frequency scanning.

The base station 110A may also determine the existence of a cluster of user equipment based on different types of user equipment feedback related to the radio environment at different locations of the cell. The existence of the cluster may also be determined based on radio frequency fingerprints (for example, radio fingerprint information utilizing radio measurements, such as received signal power, time of arrival/timing advance, and the like). Moreover, base station 110A may determine the existence of a group/cluster of user equipment based on geo-location information and other positioning information (for example, global positioning information and the like).

Figure 2:
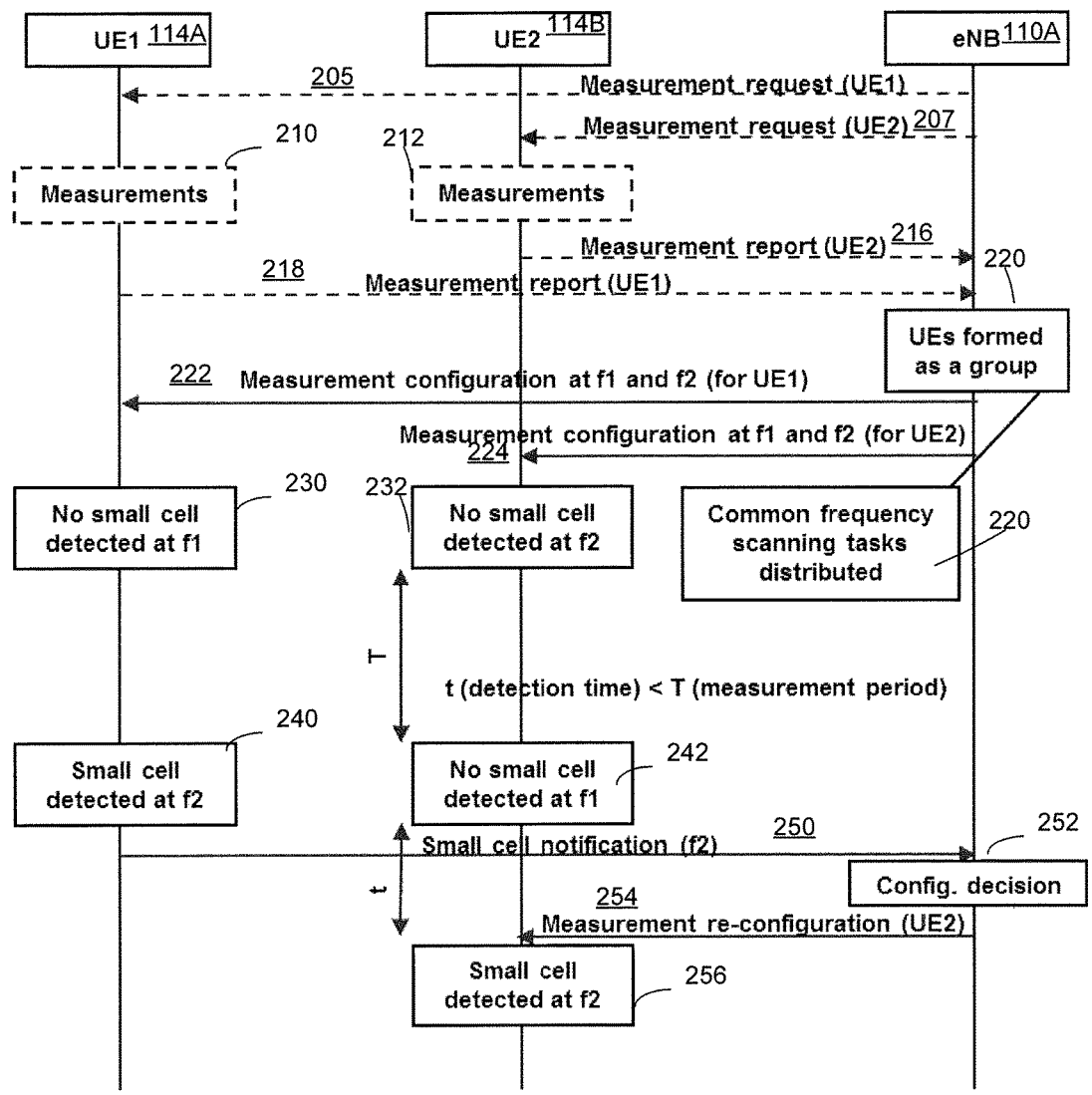
FIG. 2 depicts an example of a process for performing a distributed search for small cells, in accordance with some exemplary embodiments.

FIG. 2 depicts an example process 200 for distributed inter-frequency scanning for small cells, in accordance with some example embodiments. The description of process 200 also refers to FIG. 1.

At 205-207, a base station may send one or more measurement requests/commands to user equipment, in accordance with some example embodiments. For example, base station 110A may send a measurement request to user equipment 114A, and base station 110A may send a measurement request to user equipment 114B.

At 210-212, the requested measurements may be performed by the user equipment 114A-B, and then reported to the base station 110A at 216-218, in accordance with some example embodiments.

At 220, the base station 110A may form a user equipment group for distributed inter-frequency scanning for small cells, in accordance with some example embodiments. For example, based on the measurements and other information received at 216-218 (for example, ProSe information and other information indicative of the position/location of the user equipment) and/or other available information at the base station, base station 110A may form a group including user equipment 114A-B, which are adjacent (or near each other).

At 222 and 224, an indication may be sent to the group, in accordance with some example embodiments. For example, base station 110A may send one or more indications to user equipment 114A-B to measure frequencies f1 and f2 in accordance with a schedule that distributes scanning for small cells. The schedule may define that during a first time frame, user equipment 114A scans frequency f1 and user equipment 114B scans frequency f2, and during a second time frame equipment 114A scans frequency f2 and user equipment 114B scans frequency f1, and so forth.

At 230-232, user equipment 114A may measure, in accordance with some example embodiments, carrier frequency f1 and user equipment 114B may measure carrier frequency f2, but the measurements do not detect the carrier frequencies (so no small cells are detected). However, at 240, user equipment 114A may, in accordance with some example embodiments, detect carrier frequency f2 (although user equipment 114B at 242 has not detected anything on carrier frequency f1). For example, user equipment 114A may detect carrier frequency f2 transmitted by a wireless access point serving small cell 118B.

At 250, user equipment 114A may report a detected small cell carrier frequency and/or small cell identity to base station 110A, in accordance with some example embodiments. For example, user equipment 114A may send a measurement report indicating the detection of wireless access point serving small cell 118B at carrier frequency f2.

At 252, base station 110A may then determine whether to reconfigure user equipment 114B to scan at carrier frequency f2 to enable the user equipment 114B to detect small cell 118B, in accordance with some example embodiments. At 254, base station 110A may send to user equipment 114B an indication to reconfigure the small cell measurements to measure carrier frequency f2 and/or couple to small cell 118B, in accordance with some example embodiments. Consequently, user equipment 114B may detect small cell 118 at carrier frequency f2 at 256. When reconfigured user equipment 114B detects an allowed small cell, such as small cell 118B, user equipment 114B may detect and couple to the respective small cell 118B earlier than the originally scheduled measurement interval (for example, t<T) as shown at FIG. 2.

In some example embodiments, the disclosed distributed small cell search may be used when there is a single small cell frequency or more than one small cell frequency.

Although FIGS. 1 and 2 depicts the user equipment in a single cluster, a user equipment may be included in more than one cluster (or group) for purposes of distributed inter-frequency scanning for small cells. When this is the case, the user equipment, which is a member of more than one group, may be scheduled according to the multiple group memberships.

Before providing additional examples, the following provides additional description regarding the system framework 100 in which some of the example embodiments described herein may be implemented.

In the example of FIG. 1, base stations 110A-B may be configured as an eNB base station serving macrocells 112A and 112B (also referred to herein as cells and coverage areas). The wireless access points (WAPs) serve wireless local area networks, such as small cells 118A-D. For example, small cells 118A-D may be implemented as a picocell, a femtocell, and the like served by wireless access points, examples of which include a picocell base station, a femtocell base station, a home base station, a WiFi access point, a WLAN access point, and a home E-UTRAN node B base station (HeNB) configured in accordance with standards, such as for example for example Third Generation Partnership Project (3GPP) Long Term Evolution (LTE). Although LTE is referred to herein, it is merely an example as other standards and technologies may be used as well.

Moreover, when base stations 110A-B are implemented as an evolved Node B (eNB) type base station, as noted above, the base stations may be configured in accordance with standards, including the Long Term Evolution (LTE) standards, such as for example 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards).

In some exemplary embodiments, system 100 may include wireless access links. These access links may include downlinks for transmitting to user equipment and uplinks for transmitting from user equipment to a wireless access point/base station. The downlinks and uplinks may each comprise a modulated radio frequency carrying information, such as for example user data, control messages, radio resource control (RRC) messages, and the like. Moreover, the wireless access points/base stations may include other links, such as for example backhaul links, to other networks (for example, other mobile networks, the Internet, and the like), network nodes, and the like.

In some example embodiments, the user equipment, such as for example user equipment 114A-D, may be implemented as a mobile device and/or a stationary device. The user equipment are often referred to as, for example, mobile stations, mobile units, subscriber stations, wireless terminals, tablets, smart phones, wireless devices, or the like. A user equipment may be implemented as, for example, a wireless handheld device, a wireless plug-in accessory, or the like. The user equipment may, in some example embodiments, be configured to operate in a heterogeneous network.

Although system 100 depicts a certain configuration and quantity of base stations, wireless access points, user equipment, and cells, system 100 may include other quantities, configurations, and devices as well.

Figure 3:
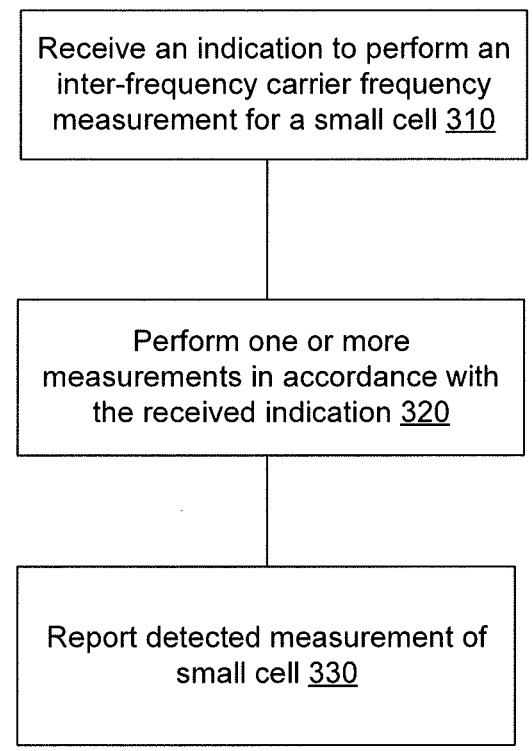
FIG. 3 depicts another example of a process for performing a distributed search for small cells, in accordance with some exemplary embodiments.

FIG. 3 depicts another example process for distributed inter-frequency scanning for small cells, in accordance with some example embodiments.

At 310, user equipment may receive an indication to perform a distributed scan, in accordance with some example embodiments. For example, the indication may signal may be sent by base station 110A to user equipment 114A to scan for one or more carrier frequencies (such as small cell carrier frequencies) at one or more time intervals. The scanning may be distributed among one or more other user equipment, such as user equipment 114B-C, proximate to user equipment 114A. Moreover, the scanning may be in accordance with a schedule, such as the one described in Table 1. The schedule may be included in the indication received at 310, although the schedule may be provided in other ways (for example, in a more static manner, such as defined in a standard and the like). In some example embodiments, the indication may also signal to the user equipment 114A that it is part of a group/cluster, which may be determined by the network/base station based on location information and the like indicating that user equipment 114A-C are proximate to each other.

At 320, a user equipment may perform, in response to the received indication, a distributed inter-frequency carrier scan by measuring a first carrier frequency during a first time period. For example, user equipment 114A may measure carrier frequency f1 during a first time period, while proximate user equipment 114B-C measure either carrier frequency f2 or remain idle. During the next time period, user equipment 114A may measure carrier frequency f2, while user equipment 114B-C measure carrier frequency f1 or remain idle.

At 330, a user equipment may send a measurement report indicating the detection of the first carrier frequency of, for example, a small cell. For example, user equipment 114A may send a measurement report to base station 110A, and this measurement report may provide information on the signal strength or detection of carrier frequency f1 and/or the small cell identity. As noted above, the base station 110A may, in response to the measurement report, signal user equipment 114A-C to for example couple to the carrier frequency (when small cell offloading is desired) or reconfigure the measurement schedule of user equipment 114B-C to enable those user equipment to more quickly detect carrier frequency f1.

Figure 4:
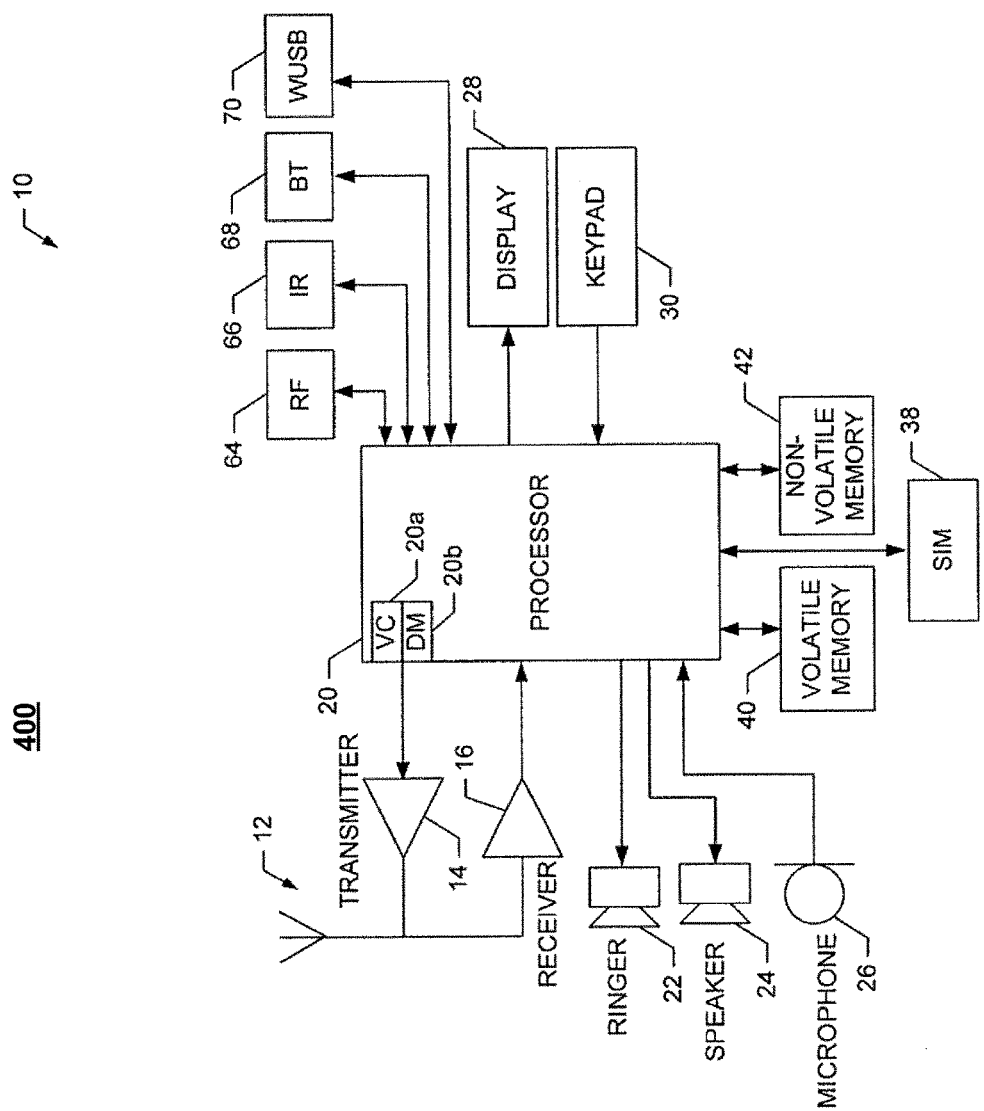
FIG. 4 depicts an example of user equipment, in accordance with some exemplary embodiments.

FIG. 4 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example for example, LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example for example, location-based content, according to a protocol, such as for example for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example for example, IEEE 802.11 techniques, IEEE 802.15 techniques, IEEE 802.16 techniques, and/or the like.

The apparatus 10 may comprise memory, such as for example for example, a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed herein with respect to the user equipment and devices, such as for example, the functions disclosed at process 200 and 300 (for example, receive an indication to perform distributed inter-frequency carrier measurements, make and report measurements, reconfigure measurements based on instructions received by the network, and/or the like). The memories may comprise an identifier, such as for example an international mobile equipment identification (IMEI) code, capable of uniquely identifying apparatus 10. In the example embodiment, the processor 20 may be configured using computer code stored at memory 40 and/or 42 to enable receiving an indication to perform distributed inter-frequency carrier measurements, making and reporting measurements, reconfiguring measurements based on instructions received by the network, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example for example, a computer or data processor circuitry, with examples depicted at FIG. 4. A computer-readable medium may comprise a non-transitory computer-readable storage medium that may be any media that can contain or store the instructions for use by or in connection with an instruction execution system, apparatus, or device, such as for example for example, a computer. In addition, some of the embodiments disclosed herein include computer programs configured to cause methods as disclosed herein (see, for example, process 200, 300, and/or the like).

Without in any way limiting the scope, interpretation, or application of the claims appearing below, a technical effect of one or more of the example embodiments disclosed herein may be reduced battery consumption at a user equipment, reduced small cell discovery or detection time, and/or avoiding unnecessary measurement gap reservation.

Figure 5:
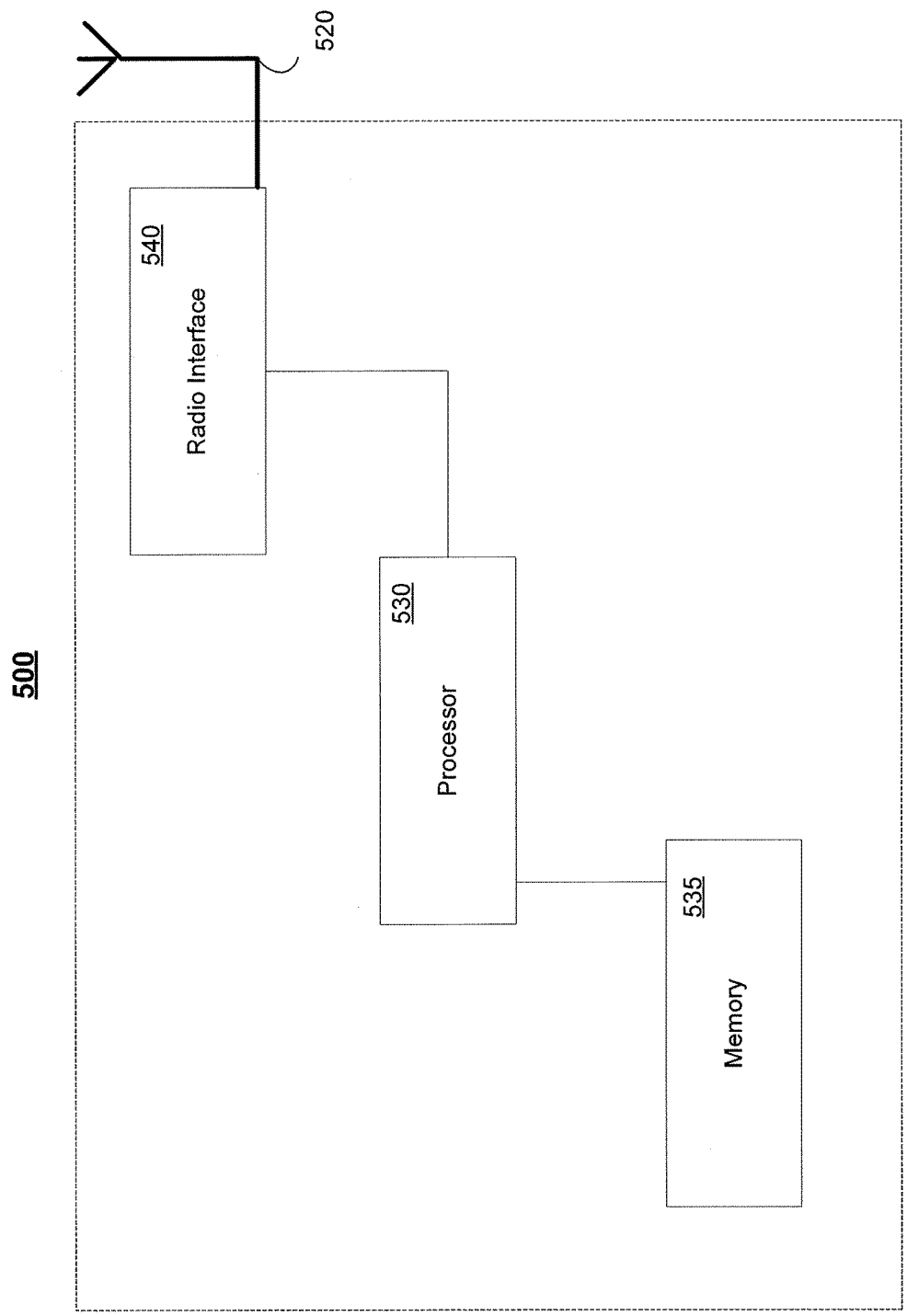
FIG. 5 depicts an example of a network node, in accordance with some exemplary embodiments.

FIG. 5 depicts an example implementation of a network node 500, such as for example a base station, an access point, and the like. The network node 500 may include one or more antennas 520 configured to transmit via a downlink and configured to receive uplinks via the antenna(s) 520. The network node 500 may further include a plurality of radio interfaces 540 coupled to the antenna 520. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 540 may further include other components, such as for example filters, converters (for example, digital-to-analog converters and the like), mappers, a Fast Fourier Transform (FFT) module, and the like, to generate symbols for a transmission via one or more downlinks and to receive symbols (for example, via an uplink). The network node 500 may further include one or more processors, such as for example processor 530, for controlling the network node 500 and for accessing and executing program code stored in memory 535. In some example embodiments, memory 535 includes code, which when executed by at least one processor causes one or more of the operations described herein with respect to network node, such as for example a base station, access point, and the like. For example, network node 500 may send an indication to perform distributed inter-frequency carrier measurements, form groups of user equipment to perform distributed inter-frequency carrier measurements, receive measurements, reconfigure user equipment to perform inter-frequency carrier measurements based on instructions received by the network, and/or other operations associated with the network node, base station, or access points disclosed herein.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   transmitting, from a network, to a first user equipment an indication to perform a distributed scan for one or more carrier frequencies with at least a second user equipment proximate to the first user equipment wherein the indication configures the first user equipment to measure a first carrier frequency during a first time period and configures the second user equipment to measure a second carrier frequency during the first time period; and
   receiving, by the network, a measurement report of the first carrier frequency from the first user equipment and a measurement report of the second carrier frequency from the second user equipment.

2. The method of claim 1, wherein the one or more carrier frequencies including the first carrier frequency and/or the second carrier frequency correspond to one or more wireless access points serving one or more small cells.

3. The method of claim 1, wherein the schedule further comprises a second time period during which the first user equipment scans the second carrier frequency and the second user equipment scans the first carrier frequency.

4. The method of claim 1, wherein when the first user equipment measures the first carrier frequency during the first time period and the second user equipment measures the second carrier frequency during the first time period, a third user equipment does not scan for small cells.

5. The method of claim 1, wherein the receiving further comprises: receiving, by the network, the measurement report of the first carrier frequency from the first user equipment to enable the network to configure the second user equipment to scan the first carrier frequency.

6. The method of claim 1, wherein the first user equipment and the second user equipment comprise a group determined by the network to perform the distributed scan, wherein the distributed scan represents a measurement task shared among a plurality of user equipment, wherein the measurement task represents one or more measurements of small cell frequencies and measurement reporting.

7. An apparatus comprising:
   at least one processor; and
   at least one memory including computer program code,
   the at least one memory and the computer program code configured to, with the at least one processor, cause the apparatus to perform at least the following:
   receive, from a network, an indication to perform a distributed scan for one or more carrier frequencies with at least a second user equipment proximate to the apparatus;
   perform, by the apparatus in response to the received indication, the distributed scan by measuring a first carrier frequency during a first time period; and
   send a measurement report of the first carrier frequency, when detected by the apparatus,
   wherein the distributed scan further comprises a schedule including the first time period during which the apparatus scans the first carrier frequency and the second user equipment scans a second carrier frequency.

8. The apparatus of claim 7, wherein the one or more carrier frequencies including the first carrier frequency and/or the second carrier frequency correspond to one or more wireless access points serving one or more small cells.

9. The apparatus of claim 7, wherein the schedule further comprises a second time period during which the apparatus scans the second carrier frequency and the second user equipment scans the first carrier frequency.

10. The apparatus of claim 7, wherein when the apparatus measures the first carrier frequency during the first time period, the second user equipment does not scan for small cells.

11. The apparatus of claim 7, wherein the apparatus is further configured to at least send the measurement report of the first carrier frequency to the network to enable the network to configure the second user equipment to scan the first carrier frequency.

12. The apparatus of claim 7, wherein the apparatus and the second user equipment comprise a group determined by the network to perform the distributed scan, wherein the distributed scan represents a measurement task shared among a plurality of user equipment including the apparatus, wherein the measurement task represents one or more measurements of small cell frequencies and measurement reporting.

13. An apparatus comprising:
   at least one processor; and
   at least one memory including computer program code,
   the at least one memory and the computer program code configured to, with the at least one processor, cause the apparatus to perform at least the following:
   transmit, to a first user equipment, an indication to perform a distributed scan for one or more carrier frequencies with at least a second user equipment proximate to the first user equipment wherein the indication configures the first user equipment to measure a first carrier frequency during a first time period and configures the second user equipment to measure a second carrier frequency during the first time period; and
   receive a measurement report of the first carrier frequency from the first user equipment and a measurement report of the second carrier frequency from the second user equipment.

14. The apparatus of claim 13, wherein the one or more carrier frequencies including the first carrier frequency and/or the second carrier frequency correspond to one or more wireless access points serving one or more small cells.

15. The apparatus of claim 13, wherein the schedule further comprises a second time period during which the first user equipment scans the second carrier frequency and the second user equipment scans the first carrier frequency.

16. The apparatus of claim 13, wherein when the first user equipment measures the first carrier frequency during the first time period and the second user equipment measures the second carrier frequency during the first time period, a third user equipment does not scan for small cells.

17. The apparatus of claim 13, wherein the first user equipment and the second user equipment comprise a group determined by the apparatus to perform the distributed scan, wherein the distributed scan represents a measurement task shared among a plurality of user equipment, wherein the measurement task represents one or more measurements of small cell frequencies and measurement reporting.

* * * * *